United States Patent

[11] 3,613,723

| [72] | Inventor | Max E. Witt<br>803 North Renville, Winthrop, Minn. 55396 |
|---|---|---|
| [21] | Appl. No. | 8,323 |
| [22] | Filed | Feb. 3, 1970 |
| [45] | Patented | Oct. 19, 1971 |

[54] CHLORINE INJECTION MEANS
9 Claims, 3 Drawing Figs.

[52] U.S. Cl. .................................................. 137/604,
137/238, 239/602
[51] Int. Cl. .................................................. F16k 19/00
[50] Field of Search........................................... 137/238,
604; 239/106, 112, 113, 602; 261/117, 118

[56] References Cited
UNITED STATES PATENTS
154,544    9/1874    Doten........................... 137/604

| 1,522,120 | 1/1925  | Halder........................ | 137/604 X |
| 3,146,950 | 9/1964  | Lancaster.................... | 239/112 X |
| 3,214,102 | 10/1965 | Meyer......................... | 239/602 X |
| 3,275,030 | 9/1966  | Alvin.......................... | 137/604 X |
| 3,361,161 | 1/1968  | Schwartz..................... | 137/604   |

FOREIGN PATENTS
198,445    6/1923    Great Britain............... 137/604

*Primary Examiner*—Robert G. Nilson
*Attorney*—Merchant & Gould

ABSTRACT: Apparatus for injecting chlorine into a water system including an elongated injection nozzle composed of a flexible material and angularly positioned with respect to the direction of waterflow or turbulence so that the nozzle is intermittently flexed thereby preventing mineral deposition on the nozzle.

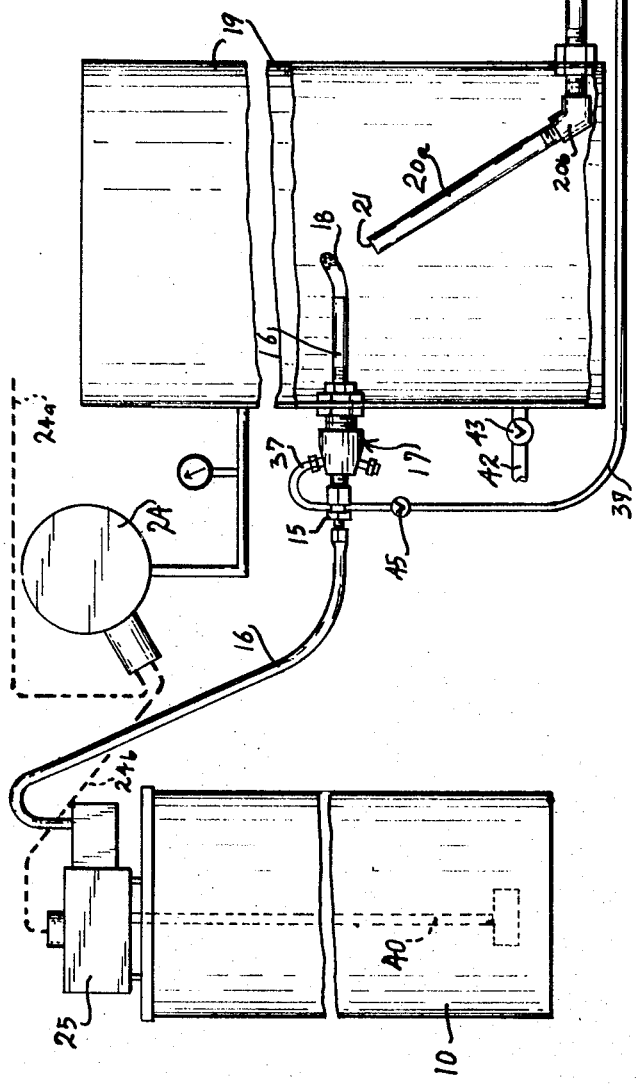
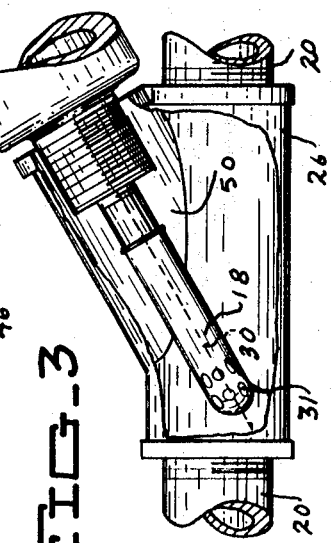
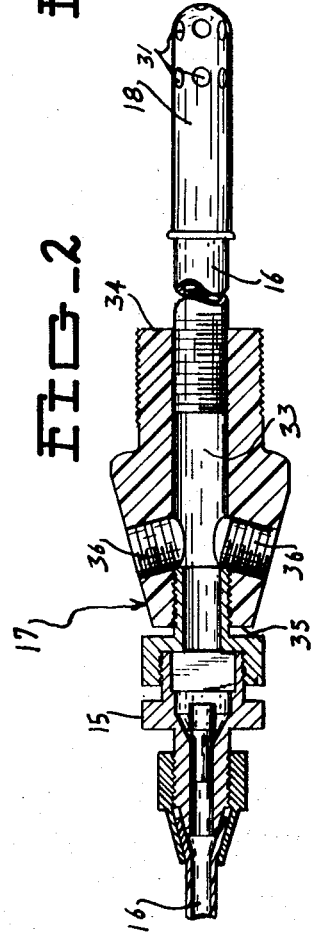
INVENTOR.
MAX E. WITT
BY
Merchant & Gould
ATTORNEYS

CHLORINE INJECTION MEANS

BACKGROUND OF THE INVENTION

The present invention relates to apparatus for introducing a material into a liquid.

Dependable, long-lasting apparatus for introducing medicants and other chemicals into a water system is commercially very desirable. For instance, at the present time, there is an acute need for dependable and long-lasting chlorine injection apparatus. This need is particularly great in rural areas and other areas not having a chlorinated municipal water supply. As is well known, the use of chlorinated water is beneficial to both humans and farm livestock. By way of example, the advantages in providing a chlorinated water supply for farm animals, such as poultry, hogs, cattle, etc., includes (1) the elimination of bacterial iron, slimes, algae, and molds that cause disease and sticking valves; (2) the elimination of the need to daily clean and disinfect the waters; (3) increased resistance to secondary disease by protecting the animals from water-borne primary diseases; and (4) the reduction of equipment corrosion and staining.

The prior art chlorine injection systems position a conventional injection orifice within a water distribution line or a suitable water reservoir. Such systems have been neither dependable or long-lasting primarily as a result of the fact that mineral deposits readily accumulate on the injection orifice and, in many cases, even back up into the chlorine supply system. This accumulation interferes with the quantity of chlorine introduced into the water system and can eventually prevent the injection of chlorine into the water. As a result, the prior art chlorinators have not provided reliably pure water.

SUMMARY OF THE INVENTION

The present invention provides injection apparatus which is both dependable and long lasting. Furthermore, the injection apparatus provided by the present invention is both economical and readily manufactured.

To provide the above advantages, the present invention comprises a first conduit for transmitting therethrough a material which is to be injected into a liquid. A second conduit transmits the liquid therethrough. A flexible injection nozzle having a substantially elongated shape is connected to an outlet in the first conduit. In one embodiment of the present invention, the injection nozzle is inserted directly into the liquid flow in the second conduit. In an alternate embodiment, the injection nozzle is positioned in a reservoir containing a quantity of the liquid and the second conduit is positioned and arranged such that an outlet in the second conduit introduces the liquid into the reservoir either directly onto the injection nozzle or in such a manner as to create a turbulence in the liquid about the nozzle. Being positioned in such a manner, the injection nozzle intermittently flexes or deflects whenever liquid is transmitted through the second conduit and then returns to its unflexed or undeflected position when transmission of the liquid is terminated. This intermittent flexing or undulating motion of the injection nozzle substantially reduces the accumulation of mineral deposits upon and within the nozzle.

BRIEF DESCRIPTION OF THE DRAWINGS

FIG. 1 is a schematic illustration of chlorine injection apparatus for utilizing in a water system;

FIG. 2 is an axial view of the chlorine injection nozzle illustrated in FIG. 1; and FIG. 3 is a partial axial view of alternate chlorine injection apparatus.

DESCRIPTION OF THE PREFERRED EMBODIMENT

The apparatus schematically illustrated in FIG. 1 includes a reservoir or source 10 containing a material which is to be injected into a liquid provided by a liquid source 11. As mentioned previously, the need for providing a dependable and long-lasting apparatus for injecting chlorine into a water system is particularly acute. In view of this, the description hereinbelow relates entirely to two embodiments which inject chlorine into a water supply system. It is to be understood, however, that the described apparatus can be utilized to inject materials other than chlorine into various liquids.

As illustrated in FIG. 1, a first conduit means comprising a conduit 16, a check valve 15, and flush and injection apparatus 17 transmits the chlorine from chlorine source 10 to a flexible injection nozzle 18. In the embodiment illustrated, injection nozzle 18 is connected to an outlet in conduit 16 and is positioned entirely within a cylindrically shaped water reservoir 19. Second conduit means comprising conduits 20 and 20a connected to each other by elbow 20b transmits water from water source 11 to reservoir 19. Conduit 20 contains a check valve 22. An outlet 21 in conduit 20a is positioned within reservoir 19 below injection nozzle 18. It should be understood, however, that it is not necessary for purposes of the present invention that the water be transported to reservoir 19 through a conduit. Any means for transporting the water will suffice so long as the waterflow provided by the chosen means is incident angularly upon nozzle 18. Consequently, the term "conduit" is meant to include any such means. Furthermore, it is not necessary for the operation of the present invention that elbow 20b and conduit 20a be connected to conduit 20. Rather, the water transmitted through conduit 20 can be simply introduced into water reservoir 19 through the outlet in conduit 20 in which elbow 20b is fitted in the illustrated embodiment.

In the preferred embodiment illustrated in FIG. 1, conduits 20 and 20a are tubular feedlines having a 1-inch diameter. Likewise, conduit 16 is a tubular chlorine feedline having a ⅜-inch diameter. Furthermore, water reservoir 19 is a pressure tank which maintains the water pressure therein within a predetermined pressure range, such as 20–40 pounds per square inch. It should be understood, however, that other size conduits and pressure ranges can be utilized. Finally, water source 11 comprises a motor and pump combination operatively connected to a well and is hereinafter referred to as motor and water pump combination 11. A pressure control means 24 is operatively connected by dotted leads 24a and 24b to motor and water pump combination 11 and a chlorine diaphragm pump and motor combination 25, respectively, so as to provide simultaneous actuation thereof as explained more fully hereinbelow.

In the chlorination system illustrated in FIG. 1, an alternate chlorine injection point 26 is provided in conduit 20. Utilization of injection apparatus at injection point 26 eliminates the need to position an injection nozzle within pressure tank 19. The manner in which chlorine is injected at this point is described in conjunction with the apparatus illustrated in FIG. 3. It should be understood, however, that it is not necessary to provide alternate injection point 26 in conduit 20. For purposes of the present invention, conduit 20 can be simply a straight feedline.

As can be seen from FIGS. 1 and 2, injection nozzle 18 is of an elongated shape and has a longitudinal axis or centerline 30 which is defined by the elongated shape of the nozzle. As illustrated, nozzle 18 has a circular cross section in a plane normal to the drawing. Positioned about the extreme end of injection nozzle 18 are a plurality of openings 31 which allow exhaustion of the chlorine transmitted to the nozzle through conduit 16. For purposes of the present invention, injection nozzle 18 is composed of a material which flexes or deflects whenever a force, such as provided by a flowing liquid, is exerted upon it. This flexure is a maximum when the force is exerted upon the nozzle in an angular direction with respect to the nozzle's longitudinal axis. By way of example, a synthetic or latex rubber and many plastic materials such as polyethylene will readily flex when a force is exerted upon it. It is readily apparent that injection nozzle 18 need be only of sufficient elongation to provide the flexing action. For example, a quite short but yet flexible nozzle can be mounted on the end of a nonflexible conduit protruding into pressure tank 19. As illustrated, conduit 16 protrudes into pressure tank 19 for this purpose. Nozzle 18 can be fastened to the end of conduit 16 by any one of numerous conventional techniques such as force-fitting.

As can be further seen in FIGS. 1 and 2, flush and injection apparatus 17 includes a passage or conduit 33 therethrough and an opening 36 for receiving a flushing conduit 37. Conduit 16 is in threaded engagement with end 34 of flush and injection apparatus 17. Conventional check valve 15 is suitably threaded for connection with end 35 of the flush and injection apparatus to prevent a backflow of water into chlorine tank 10. In effect, passage 33 and check valve 15 form one segment of conduit 16. It should be understood, however, that for purposes of the present invention it is not necessary that apparatus be provided for flushing nozzle 18. That is to say, conduit 16 can be simply a straight feed line having a check valve inserted therein for preventing the backflow of water into chlorine tank 10.

In operation, pressure control means 24 actuates motor and chlorine pump combination 25 whenever the water pressure in pressure tank 19 falls below a certain predetermined pressure. As a result, chlorine is pumped from tank 15 through a strainer and suction tube 40 to chlorine feedline 16 and then exhausted into tank 19 through injection nozzle 18. For operation in a conventional manner, motor and water pump combination 11 is actuated and deactuated simultaneously with motor and chlorine pump combination 25. However, for a description of an advantageous, nonconventional manner of operation, see my copending patent application Ser. No. 8,324, filed Feb. 3, 1970.

The water transmitted through conduits 20 and 20a and elbow 20b upon actuation of motor and water pump combination 11 is introduced into pressure tank 19 through outlet 21. To cause maximum flexing of nozzle 18, outlet 21 is preferably positioned at a distance from the injection nozzle so that the water introduced into the pressure tank is incident directly upon the nozzle. Furthermore, outlet 21 is positioned so as to direct the waterflow exhausted therefrom onto injection nozzle 18 in an angular manner with respect to longitudinal axis 30 of the elongated nozzle. As a result of this positioning, nozzle 18 is deflected or flexed from its quiescent position and then undergoes further intermittent flexing or undulation whenever water flows through conduit 20. This flexing action causes any mineral deposits on nozzle 18 to crack or flake. The deposits are then flushed away by the water flow about the nozzle. Nozzle 18 is shown in a deflected or flexed position in FIG. 1.

As mentioned previously, however, conduit 20a and elbow 20b are not necessary for the operation of the present invention. Instead, the water may be introduced directly into pressure tank 19 from an outlet in conduit 20. When this is the case, the water inflow from conduit 20 will create sufficient turbulence in the water within pressure tank 19 to cause nozzle 18 to undergo a flexing motion which will prevent the accumulation of mineral deposits thereon. Thus, any communication of the water introduced into tank 19 with nozzle 18 which causes this type of flexing action will suffice for purposes of the present invention.

When the pressure within tank 19 reaches a certain predetermined level, pressure control means 24 deactuates motor and pump combinations 11 and 25 thereby terminating the pumping of water and chlorine, respectively, into pressure tank 19. Upon termination of the waterflow, nozzle 18 returns to its unflexed or undeflected position as illustrated in FIG. 2 and check valve 22 prevents a backflow of water from tank 19 into the water well. The water containing the injected chlorine is exhausted out of pressure tank 19 through a distribution line 42 in response to the open or closed position of a shutoff valve 43.

To further prevent accumulation of mineral deposits on nozzle 18, the embodiment illustrated in FIGS. 1 and 2 includes apparatus for flushing the nozzle. To provide this flushing action, a flush tube 37 connects conduits 16 and 20. Shutoff valves 45 and 46 are positioned in flush tube 37. With valves 45 and 46 in their open positions, a portion of the waterflow within conduit 20 is transmitted through flush tube 37 to opening 36 in flush and injection apparatus 17. The water transmitted through opening 36 enters passage 33 and flows into conduit 16 and is finally injected by nozzle 18 into pressure tank 19. Preferably, the flushing action and injection of chlorine occur simultaneously so as to provide an increased liquid flow through nozzle 18. This increased liquid flow will pick up and remove any mineral deposits which may have found their way into nozzle 18 or which are lodged in openings 31. As a result, the accumulation of mineral deposits and other residue is further reduced.

FIG. 3 illustrates an embodiment of the present invention wherein apparatus is provided for injecting chlorine directly into second conduit means 20 at alternate injection point 26. As mentioned previously, utilization of this apparatus eliminates the need for positioning injection nozzle 18 within pressure tank 19. As illustrated, second conduit means 20 has an opening 50 which is substantially perpendicular to the circular cross section of the conduit. Nozzle 18 is connected to the end of conduit 16 and is preferably of sufficient length to extend across substantially the entire circular cross section of conduit 20. A check valve (not shown) and apparatus (not shown) for flushing nozzle 18 can be included in conduit 16 in the same manner as previously described in conjunction with FIGS. 1 and 2. Upon waterflow through conduit 19, the water is incident upon nozzle 18 in an angular direction with respect to longitudinal axis 30 of nozzle 19. As a result, nozzle 19 undergoes a flexing action of the type previously described.

It will be readily apparent to those skilled in the art that numerous modifications can be made to the embodiment described hereinabove. For example, alternate choices for the geometry and composition of nozzle 18 are considered to be well within the skill of the ordinary artisan. Furthermore, it is to be understood that the gist of the present invention is the utilization of a flexible injection nozzle positioned in communication with a liquid flow so that the flow causes intermittent deflection or flexing of the nozzle to thereby prevent accumulation of mineral deposits thereon.

What is claimed is:

1. Apparatus for introducing a material into a liquid comprising:
   a. means defining a first conduit suitable for transmitting said material therethrough;
   b. means defining a second conduit suitable for transmitting said liquid therethrough;
   c. means defining a flexible injection nozzle connected to said first conduit for injecting said material into said liquid, said injection nozzle being positioned in communication with said liquid so that said liquid can flow about and through said nozzle to cause said nozzle to undergo a flexing motion preventing the deposition of said material thereon; and
   d. valve means positioned in said first conduit upstream of said injection nozzle for preventing backflow of said liquid beyond said valve means.

2. The apparatus of claim 1 wherein:
   a. said second conduit means defines an enclosed passage having a substantially circular cross section and having an opening therein substantially perpendicular to said circular cross section; and
   b. said injection nozzle means is positioned and arranged in said opening so as to extend into said second conduit for communication with said liquid transmitted by said second conduit in an angular manner with respect to the longitudinal axis of said elongated nozzle.

3. The apparatus of claim 2 wherein said elongated injection nozzle is generally cylindrically shaped and extends angularly across substantially the entire circular cross section of said enclosed passage.

4. The apparatus of claim 3 wherein:

a. said first conduit means defines an opening therein between said valve means and said injection nozzle; and
b. said first conduit means includes a conduit connecting said second conduit means and said opening in said first conduit means for introducing a flow of said liquid into said first conduit so as to flush said injection nozzle.

5. The apparatus of claim 4 wherein:
a. said liquid is substantially water;
b. said material is substantially chlorine;
c. said injection of said material and said flushing of said nozzle occur simultaneously; and
d. said flexible injection nozzle is substantially comprised of a plastic material and defines a plurality of openings therein for exhausting said chlorine and for allowing said liquid to flow therethrough during said flushing of said nozzle.

6. The apparatus of claim 1 including reservoir means for containing a quantity of said liquid therein:
a. said injection nozzle means is positioned substantially entirely within said reservoir means;
b. said second conduit means is adapted to introduce said liquid into said reservoir means, said liquid introduced therein being directed onto said injection nozzle means at an angular direction with respect to the longitudinal axis of said elongated nozzle for causing deflection thereof.

7. The apparatus of claim 6 wherein:
a. said reservoir is a substantially cylindrically shaped tank adapted to contain said liquid under pressure and having outlet means therein for exhausting said liquid and injected material; and
b. said injection nozzle means is positioned in said tank substantially normal to the cylindrical walls of said tank.

8. The apparatus of claim 7 wherein:
a. said first conduit means defines an opening therein between said valve means and said injection nozzle; and
b. said first conduit means includes a conduit connecting said second conduit means and said opening in said first conduit means for introducing a flow of said liquid into said first conduit so as to flush said injection nozzle.

9. The apparatus of claim 8 wherein:
a. said liquid is substantially chlorine;
b. said material is substantially water;
c. said injection of said material and said flushing of said nozzle occur simultaneously; and
d. said flexible injection nozzle is composed substantially of a plastic material and defines a plurality of openings therein for exhausting said chlorine and for allowing said liquid to flow therethrough during said flushing of said nozzle.